(12) United States Patent
Kaplan

(10) Patent No.: US 7,155,510 B1
(45) Date of Patent: Dec. 26, 2006

(54) SYSTEM AND METHOD FOR FORECASTING INFORMATION USING COLLECTIVE INTELLIGENCE FROM DIVERSE SOURCES

(75) Inventor: Craig Andrew Kaplan, Capitola, CA (US)

(73) Assignee: PredictWallStreet, Inc., Capitola, CA (US)

( * ) Notice: Subject to any disclaimer, the term of this patent is extended or adjusted under 35 U.S.C. 154(b) by 792 days.

(21) Appl. No.: 10/107,420

(22) Filed: Mar. 26, 2002

Related U.S. Application Data

(60) Provisional application No. 60/279,242, filed on Mar. 28, 2001.

(51) Int. Cl.
*G06F 15/173* (2006.01)
*G06F 15/167* (2006.01)

(52) U.S. Cl. .............. 709/224; 709/227; 709/238; 705/8; 705/10; 715/507; 707/2; 707/513

(58) Field of Classification Search ............. 709/203, 709/223, 228, 245, 224, 227, 238; 713/1; 364/146; 705/8, 10; 715/507
See application file for complete search history.

(56) References Cited

U.S. PATENT DOCUMENTS

| | | | |
|---|---|---|---|
| 4,713,775 A | 12/1987 | Scott et al. | |
| 4,745,468 A | 5/1988 | Von Kohorn | |
| 4,872,122 A | 10/1989 | Altschuler et al. | |
| 5,774,656 A * | 6/1998 | Hattori et al. | 709/223 |
| 5,862,223 A | 1/1999 | Walker et al. | |
| 5,875,108 A * | 2/1999 | Hoffberg et al. | 700/17 |
| 6,094,674 A * | 7/2000 | Hattori et al. | 709/203 |
| 6,223,165 B1 | 4/2001 | Lauffer | |
| 6,366,956 B1 * | 4/2002 | Krishnan | 709/223 |
| 6,446,200 B1 * | 9/2002 | Ball et al. | 713/1 |

* cited by examiner

*Primary Examiner*—Khanh Quang Dinh
(74) *Attorney, Agent, or Firm*—Perkins Coie LLP

(57) ABSTRACT

System, method, computer program product, and business operating model. Information processing system comprising: server computer having processor for executing computer instructions and memory coupled to processor for storing instructions and data; communications link for communicating between server and information appliance client entities external to server, communication link enabling receipt of first information from a plurality of external entities and for transmitting second information to second entities, first and second entities may be same entities or different entities; data store defining database for storing first and second information; computer program having plurality of executable command instructions and executing in processor and memory for generating second information from at least some of plurality of first information; wherein first information comprising plurality of individual information items and second information comprising processed collective information generated from plurality of individual information items and having increased value to second entities by virtue of collective contribution and processing applied thereto.

90 Claims, 5 Drawing Sheets

Current Stock Quotes: IBM 94.96   MSFT 54   ORCL 16.06   ARBA 1
Collective Forecasts: IBM 95      MSFT 53   ORCL 16      ARBA 1

FIG. 2

PREDICT WALLSTREET
Investment Intelligence for Everyone(TM)

iQ
COMPANY

Welcome ck: Current Stock Quotes: Today's price quotes appear
Collective Forecasts: Tomorrow's price estimates The Tomorrow Ticker(TM) provides
FREE stock quotes & FREE collective forecasts.

| Please enter up to 10 stock symbols | | | | | Symbol Lookup |
|---|---|---|---|---|---|
| IBM | MSFT | ORCL | ARBA | NITE | Go |
| IFMX | | | | | Clear |

Login to participate in our CLICK-DONATION program!
SAVE OUR SHORES gets $.01 for every stock estimate made on this site.

SAVE OUR SHORES

Trouble viewing the site? Please see our list of supported browsers.
Important: Information on this site does not constitute investment advice!

Home   About iQ   FAQ's / Help   Press Room   Legal Terms   Privacy   Contact   Login
Copyright © 2000 IQ Computer. All rights reserved.

FIG. 3

PREDICT WALLSTREET◊
Investment Intelligence for Everyone(TM)

iQ Current Stock Quotes:     IBM 94.96  MSFT 54   ORCL 16.06   ARBA 1
COMPANY Collective Forecasts:     Tomorrow's price estimates appear here To receive collective forecasts for these stocks, enter your estimate of their closing prices on 3/15/01 at 4pm, EST.
If you are logged in, SOS will receive $.01 for each of your estimates.

The Tomorrow Ticker displays automatic updates every 5 minutes. Use the Refresh button in your browser to force an instant update.

| Stock | Delayed Quote | Volume | Your Estimate |
|-------|---------------|--------|---------------|
| IBM | $ 94.96 | 14,244,600 | |
| MSFT | $ .54 | 45,343,300 | |
| ORCL | $ 16.06 | 52,862,100 | |
| ARBA | $ 12 | 14,166,600 | |
| NITE | $ 15.88 | 1,192,000 | |
| IFMX | $ 5.69 | 3,795,700 | |

[Go] [Clear]

Home   About iQ   FAQ's / Help   Press Room   Legal Terms   Privacy   Contact   Login
Copyright © 2000 IQ Computer. All rights reserved.

FIG. 4

PREDICT WALLSTREET
Investment Intelligence for Everyone (TM)

iQ COMPANY

Current Stock Quotes: IBM 94.96   MSFT 54   ORCL 16.06   ARBA 1

Collective Forecasts: IBM 95   MSFT 53   ORCL 16   ARBA 1

The collective forecasts displayed here do not constitute investment advice or recommendations.

Thank you. If you logged in, SOS received $.01 for each estimate.
Here are your collective forecasts for 3/15/01 at 4pm EST.

The Tomorrow Ticker displays automatic updates every 5 minutes. Use the Refresh button in your browser to force an instant update.

| Stock | Delayed Quote | iQ Collective Forecast | Your Estimate |
|-------|---------------|------------------------|---------------|
| IBM   | $ 94.96       | $ 95                   |               |
| MSFT  | $ .54         | $ 53                   |               |
| ORCL  | $ 16.06       | $ 16                   |               |
| ARBA  | $ 12          | $ 12                   |               |
| NITE  | $ 15.88       | $ 15                   |               |
| IFMX  | $ 5.69        | $5.5                   |               |

[ Go ]   [ Clear ]

Home   About iQ   FAQ's / Help   Press Room   Legal Terms   Privacy   Contact   Login
Copyright © 2000 IQ Computer. All rights reserved.

FIG. 5

SYSTEM AND METHOD FOR FORECASTING INFORMATION USING COLLECTIVE INTELLIGENCE FROM DIVERSE SOURCES

RELATED APPLICATIONS

This application claims the benefit of priority to U.S. Provisional Patent Application Ser. No. 60/279,242, filed Mar. 28, 2001 and entitled Tomorrow ticker: a system for using collective intelligence to forecast future values of financial or other quantifiable information, which provisional application is hereby incorporated by reference.

BACKGROUND

Heretofore, conventional wisdom has held that it is impossible to predict the stock market with any degree of accuracy. The same conventional wisdom has also been directed to other financial and economic markets and institutions albeit perhaps to a lesser degree.

Yet despite such conventional wisdom many other people have tried to develop mathematical models that predict stock market behavior. What almost all of these other mathematical models have in common is that they are based on economic inputs—interest rates, assumptions about supply and demand, the expansion of the economy, and the like economic factors and indicators. Many of these models are tuned and validated against actual past historical data, and then are used to try to predict future data or behavior. Unfortunately, no known model of this type has worked sufficiently well to overturn the general opinion that the stock market cannot be predicted with any useful degree of accuracy. And, in particular no known conventional model has permitted stock market prediction in a time frame that permits stock market trading decisions to be usefully made based on such predictions.

Besides the people using mathematical models to predict the stock market, there are also mutual fund managers, analysts, brokers, day-traders, and other financial services professionals, who make their living (or try to make a living) by trying to make accurate judgments about what the market is doing or about to do. That most of these professionals are not very accurate, is perhaps best illustrated by the observation that just buying the Standard & Poors (S&P) 500 would allow an investor to outperform 80% of these professional money managers and financial advisors. In fact, the Wall Street Journal and other newspapers have great fun with contests that pit the "dartboard" (random stock picks) against the top analysts—illustrating that the professionals are often worse than random chance at picking stocks.

Another approach is to provide a website that solicits the stock picks of individual investors. The websites rate these individual investors based on their performance picking stocks on the website, much the same way the newspapers have rated analysts. These sites are attempting to discover new experts among the masses of everyday investors. These sites are not directed to predicting particular stock values at particular times and are more nearly directed to longer term performance picks.

Other websites and models and methods associated with such websites have expert analysts on staff who sort through the information generated by the masses, and try to find nuggets that help drive investment decisions. These sites are attempting to leverage the information gathering capabilities of Internet users to do the research for their own in-house experts.

Both web-based approaches rely on conventional wisdom, which says that individual experts (either in-house experts or experts that have been rated by the website) but not ordinary non-expert investors are the key to making good investment decisions. Although use of the Internet makes the approaches seem to be high technology approaches, really the paradigm is an old one: experts will make the best guesses.

The idea that the collective intelligence of many individual investors could outperform the experts has not heretofore been considered as it seemed counter-intuitive to most investment professionals. For example, recently a stock trader with twenty years experience and a seat on a major exchange opined that using the collective wisdom of many investors did not seem like a fruitful approach to forecasting stock prices. His reasoning was that if many people believed something, this belief was probably already factored into the prices and you couldn't make money by acting on what lots of people believed.

The current conventional wisdom when it comes to forecasting stock prices can pretty much be summarized by the following two themes: (i) it probably can't be done reliably, and (ii) if it can be done at all, it requires specialized experts. The current state of forecasting technology reflects this wisdom where attempts are made to identify and utilize one or a small group of experts, but none of these systems do very well compared to chance.

SUMMARY

In one particular embodiment, the invention provides an information processing system comprising: a server computer having a processor for executing computer instructions and a memory coupled to the processor for storing instructions and data during the processing; a communications link for communicating between the server computer and information appliance client entities external to the server computer, the communication link enabling receipt of first information from a plurality of external entities and for transmitting second information to second entities, the first and second entities may be the same entities or different entities; a data store defining a database for storing the first information and the second information; a computer program having a plurality of executable command instructions and executing in the processor and the memory for generating the second information from at least some of the plurality of the first information; wherein the first information comprising a plurality of individual information items and the second information comprising a processed collective information generated from the plurality of individual information items and having an increased value to the second entities by virtue of the collective contribution and processing applied thereto.

In another particular embodiment, the invention provides a method of generating a collective information for a particular item from a plurality of raw information for that same item, the method comprising: gathering raw information from a plurality of first entities for a particular item; processing the plurality of raw information or informations for the particular item to generate a processed collective information for the item; and communicating the processed collective information to second entities.

In another aspect, the inventive method is implemented as a computer software program executing on one or more computers or information appliances, such as for example on a conventional server computer serving content and providing information or data to client computers or devices over an internet network connection. In such situations, the invention provides a computer program and computer program product for use in conjunction with a computer system, the computer program product comprising a computer readable storage medium and a computer program mechanism embedded therein, the computer program mechanism, including a program module that directs the computer to function in a specified manner, the program module including instructions for generating a collective information for a particular item from a plurality of raw information for that same item, by gathering raw information from a plurality of first entities for a particular item, processing the plurality of raw information or informations for the particular item to generate a processed collective information for the item, and communicating the processed collective information to second entities.

In another aspect, the invention provides various business methods and operating models.

BRIEF DESCRIPTION OF THE DRAWINGS

FIG. 2 is a diagrammatic illustration showing an embodiment of a multi-line scrolling ticker displaying the current price and the price forecasted by embodiments of the inventive method for various stocks.

FIG. 3 is a diagrammatic illustration showing an embodiment of a computer screen showing an exemplary display screen where a user requests stock quotations.

FIG. 4 is a diagrammatic illustration showing an embodiment of a computer screen showing an exemplary display screen where a user enters one or more stock forecasts.

FIG. 5 is a diagrammatic illustration showing an embodiment of a computer screen showing an exemplary display screen where the system display collective stock forecast(s).

DETAILED DESCRIPTION OF EMBODIMENTS

Figure 1:
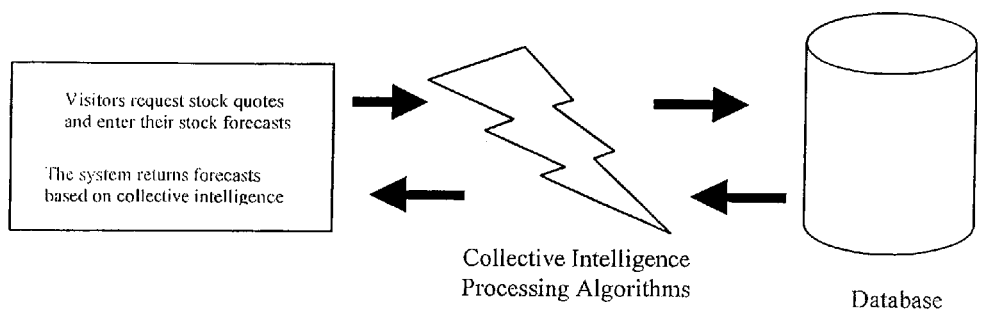
FIG. 1 is a diagrammatic illustration showing an embodiment of a basic system architecture of the invention.

In one aspect, the inventive system, method, computer program and computer program product takes a unique and novel approach to the problem of quantitative forecasting, including financial forecasting such as predicting movements in stock prices. The approach is based on the collective intelligence of many individual investors, rather than on the intelligence of any one expert or group of recognized experts. And contrary to other approaches based on human intelligence which, if they have any success at all, tend to be successful at predicting long term trends, the inventive approach can predict short or long term stock movements on a real-time basis—much the same way the market itself moves.

It is useful to consider some of the probable objections to this approach by those who follow conventional doctrines, that is some of the reasons conventional wisdom would suggest this approach shouldn't work. These anticipated objections suggest reasons why such an approach has not heretofore been considered. First, there is the supposition that market fluctuations are inherently random and that no one can predict what the market will do next; and, if they could, someone would have already done it. Furthermore, it is supposed that the best that is possible is to predict long-term trends, and even then it is matter for experts.

Second, individuals don't know much about the market and will be just guessing randomly. Since the inputs from non-experts are considered by many to be merely guesses, such an approach would represent a guesses-in-guesses-out scenario, so that such a system and method would not be expected to be capable of predicting anything with accuracy.

Third, even if people did know anything about the stock market, they would not share it with others, and possibly would rather put false information into the system in order to manipulate the system's predictions to their own financial advantage.

Fourth, there is the supposition that any information that people might have, they have already acted on, so that their predictions are already reflected in the options market, which is actually a record of the predictions that people have already made that they are willing to back up with money.

Empirical evidence based on initial prototype testing suggests that these supposed problems do not exist or at least do not exist to the detriment of the inventive system and method. These prototype tests (See Experimental Data section) indicate that a reliable forecasting invention can be built, that it can work with the collective intelligence of ordinary investors having average knowledge and does not require experts.

Although the various embodiments and operational examples described herein are directed to system and method for predicting or forecasting stock prices, it will be appreciated by those having ordinary skill in the art in light of the description provided herein that the principles and the invention described can be used for forecasting future values of almost any quantitative information. As long as many people have knowledge that relates well to the values being forecast, the inventive system and method are applicable.

For example, the invention can be easily applied to forecasting a wide range of values related to human behavior including financial information for markets of all kinds (bonds, stocks, government securities, commodity futures, etc.). But the invention can also be applied to forecasting of sports scores, political elections, or future events of any kind that can be quantified and for which many people possess relevant knowledge.

The invention provides system, method, computer program, and computer program product for generating quantitative forecasts, based on the collective intelligence or data input of many individuals or other entities. Other entities includes all sources whether human or not. For example, entities refers to the fact that the inventive system and method may incorporate predictions from non-human agents as well as from human agents. Such inputs may include inputs from a computerized software agent that is capable of making (hopefully accurate) quantitative forecasts, this computerize agent may be treated by the inventive system and method in the same way as a human agent or the manner in which its inputs are handled may be modified to take into account any particular characteristics of such computerized agent. In one embodiment, various factual data may also be utilized, such as for example public or proprietary financial or economic data. In general then it will be appreciated that the input from zero or more computerized agents or other non-human entities may be combined with zero or more human agents using the methods of the invention to produce a more accurate collective forecast. This quantitative forecasts find particular application to forecasting financial information such as stock and bond prices, stock index values, interest rates, international currencies, gold and precious metals, agricultural product futures, and the like.

Key components of the invention include a means for gathering individual forecasts from a plurality individuals or other entities within a defined period of time. This defined period of time will depend on the particular metric or value that is being forecast and the time frame in which the market or metric within the market changes. For example, in the NASDAQ stock exchange, for a forecast of closing prices the following day, it would be expected that the individual intelligence inputs would be collected within a time frame measured in no more than hours, and more typically in terms of seconds or minutes. The invention also includes means for filtering and processing these individual forecasts to generate a collective forecast, and a means of communicating the collective forecast back to individuals very quickly. These three components comprise a real-time system for generating accurate quantitative forecasts. It will therefore be appreciated that the time period is more desirably short so that the forecast reflects the current state of the market and in some cases older individual forecasts may be discounted as a function of their age.

The filtering and processing algorithms that receive as inputs the individual intelligence data and output the collective forecast are particularly important. A wide range of algorithms can be used, and are desirably chosen according to the nature of the information that is being forecast. Even with a particular forecasting environment, different algorithms may be applicable to different market conditions. The invention is therefore adapted to permit algorithms to be added and/or modified to improve forecast accuracy and speed under different or changing market conditions.

Auxiliary components, such as procedure, algorithms, additional data, and/or other means for improving the processing algorithms via machine learning techniques may improve the system's overall accuracy over time. Use of the Internet and state-of-art wireless capabilities may increase the number of people who provide forecasts, thus increasing the accuracy of the system. User interfaces which encourage more busy professionals to participate and provide their forecasts may also improve system forecasting performance. The Internet and wireless technologies (particularly from thin client devices such as PDAs and cellular telephones) also allow the system to receive individual forecasts and the generated collective forecasts to be communicated to a large number of people simultaneously, and to be updated in real-time or substantially in real-time.

In one particular aspect, the invention further provides a multiple line ticker, which can display several related types of information at once. Specifically, in one embodiment this multi-line ticker displays both the current values of certain types of information and forecasted values of the same types of information at some future date. In the embodiment directed to stock market price predictions, it displays the current price of a stock and the forecast price of the same stock at some arbitrary time (for example 24 hours or at the close of the next trading day) in the future.

Having now described some of the theory, advantages, and operation, attention is now directed to exemplary embodiments of the system, method, computer program and computer program product of the invention. It is further noted that the inventive method is advantageously implemented as a software or firmware computer program having a plurality of executable instructions for execution within a processor and associated memory of a general purpose computer. For example, such computer program software may execute within a computer configured and connected to a network such as the Internet (or an Intranet) as a server.

With reference to FIG. 1, an exemplary embodiment of the basic system architecture is now described. A simple form of the system consists of a website, a database, and proprietary information processing algorithms. Conventional network infrastructure, such as the Internet (or Intranet or VPN) infrastructure may be utilized along with any supported web access device such as a user workstation, computer, personal data assistant (PDA), cellular or conventional telephone, or other information appliance or access device.

Users or visitors 110 access a website 112 over a network such as the Internet 113 to get stock quotes (or other factual information) 114 and (optionally) enter individual stock price estimates (or other individual estimates, forecasts, or predictions) 116. Individual estimates 116 are optionally but desirably filtered or otherwise processed to attempt to neutralize or otherwise prevent possible attempts to manipulate the system or improperly influence the collective forecast, and the individual estimates are then stored in a database 118. Alternatively, the individual estimates may be first stored in some sort of database and later filtered. Collective Intelligence processing algorithms 120 generate system forecasts using the plurality of individual estimates 116, and these collective forecasts are then displayed to the visitors on the website. One of the innovative components of the present system and method is a multi-line scrolling ticker that can display several sources of information simultaneously. For example, FIG. 2 shows how the multi-line scrolling ticker may display the current price and the forecasted price of various stocks.

The inventive system includes a database for storing individual user inputs and predictions, intermediate calculations as required, and collective forecasts. It will also store user prediction histories and other parameters, preferences, and data as described herein elsewhere. In one prototype implementation, Microsoft Access was used to provide a relational database however, other data base products such as Oracle database software made by Oracle Corporation, DB2 made by IBM Corporation., and SQL Server made by Microsoft Corporation may alternatively be used. Database technology is well established and any conventional technique may be used as is known in the art.

An embodiment of the inventive method is now described. This description is followed by a more mathematically rigorous development.

In one embodiment, the input to the collective intelligence calculations are many individual numerical forecasts. The output is a single collective forecast. This single collective forecast could be as simple as an average of all the individual forecasts or may involve other more complex calculations. When the calculation is a simple mean or average, for example, if first user John thinks IBM stock will close the next day at $150/share, second user Sue thinks IBM stock will close the next day at $125/share, and third user Pete thinks IBM will close tomorrow at $100/share, the inventive system and method could simply average all these forecasts and create a collective forecast that IBM will close tomorrow at $125 which is the mathematical mean or average of the three predictions ((150+125+100)/3=125).

This is computation is simplistic, but still may yield acceptable results if the number of individual forecasts is large and if the quality of the forecasts is good. A better approach is to uses a more sophisticated weighted averaging scheme. The reason for this weighted averaging scheme is that we are trying to extract as much useful information from as few individual forecasts as possible.

The simple average treats predictions for the IBM stock price by users John, Sue and Pete equally. It assumes that each individual is equal in his or her ability to forecast the future price of IBM stock. But we know that this is probably not true. Some people know more than others, some people are more diligent that others, and some are simply better at math than others. So we know there will be individual differences in people's ability to forecast stock prices just as there are individual differences in people's abilities to make sound decisions in other matters. The trick is to have a mathematical formula that takes these individual differences into account and makes allowances for them in such a way that the overall system accuracy is improved. A weighted averaging scheme according to one embodiment does this.

Conceptually, the collective intelligence algorithms weight each individual's forecast by a weighting factor (referred to in one embodiment as the WPSE), which reflects how good that individual has been at predicting the particular stock in question. Each individual will have a different WPSE for each different stock that he or she predicts. Over time, the WPSEs are adjusted or updated to reflect how accurate the individual is. Thus the inventive system and method learns how good each individual is at predicting each stock and uses this learning to adjust its overall collective forecasts. This learning is reflected at least in the information stored in the database, and optionally permits selecting and tuning the computational algorithm participating in the generation of collective forecasts. Moreover, the system and method may advantageously compare how accurate each individual is to all the other individual's who are predicting. This is one of the reasons that the more individuals who use the system, the better job the system can do of creating an accurate collective forecast.

Attention is now directed to a particular procedure and algorithm desirably implemented as computer program software executing on a server processor, or distributed among a plurality of processors. Key variables and parameters are first defined and then an exemplary algorithm is described using these variables and parameters. This example is directed toward a system and method that receive as inputs individual estimates for the closing price of a stock and generate the collective forecast for the closing price of that same stock. Note that although closing prices are used in the example, the logic can easily be extended to apply to prices at any given point in time.

The Last Estimated Closing Price (LECP) is the last estimate that an individual user entered for a given stock on a day. The Actual Closing Price (ACP) is the actual closing price for a stock at the close of the market (e.g. 4:00 p.m. Eastern Standard Time).

The Prediction Error (PE) expressed as a percentage (%) is the prediction error for a single individual making a single estimate of a single stock and is equal to the absolute value of the difference between the estimated closing price and the actual closing price for that particular stock. The prediction error is therefore equal to the absolute value of the difference between the last estimated closing price and the actual closing price divided by the actual closing price or PE=(ABS(LECP−ACP))/ACP. The prediction error is normalized by the actual closing price so as to provide some equalization between the weight or influence of high-priced and low-priced stocks.

The Prediction Stock Error (PSE) is equal to the average of the Prediction Errors ($PE_1$, $PE_2$, ..., $PE_n$) for a single individual on a single stock over the entire period that individual has been making predictions about that particular stock. If $PE_1$ is the error of the first estimate the individual made for a given stock and $PE_n$ is the error of the last estimate the individual made for the stock, then the prediction stock error is the average of the individual prediction errors or: PSE=AVG($PE_1$ ... $PE_n$).

Having now computed the Prediction Stock Error (PSE) for each particular individuals for a particular stock ($PSE_1$, $PSE_2$, ..., $PSE_n$,) it is now possible to compute an Average Prediction Stock Error (APSE) which is equal to the average of all the Prediction Stock Errors ($PSE_1$, $PSE_2$, ..., $PSE_n$,) for a particular stock. Note that the Prediction Stock Error is itself an average, so this is really an average of individual averages. If $PSE_1$ is the average error for individual 1, and $PSE_n$ is the average error of the last individual who has made predictions for the stock, then the average prediction stock error is: APSE=AVG($PSE_1$ ... $PSE_n$).

Advantageously weights are applied so that the weight applied to each individuals predictions may be adjusted according to some metric associated with or attributed to that individual's demonstrated historical skill in accurate prediction. A Weighted Prediction Stock Error (WPSE) is therefore defined that is equal to the Average Prediction Stock Error (APSE) divided by the Prediction Stock Error (PSE). Basically this means that we use a weight, the ratio of how much error everyone has at predicting a given stock (the average prediction error), compared to how much error a particular individual is doing at predicting a given stock. If the individual has a low error, relative to the group error, then the weight give to that individual's prediction is large; and if the individual has high error relative to the group, than the weight given to that individual is small. (In one embodiment, where the individual appears to have consistently large error or appears to be merely guessing or entering predictions that have not connection to reality, the weight given to that individual's prediction may be very small or even zero. Mathematically: the weighted prediction stock error is give by the expression WPSE=APSE/PSE, where PSE is the average of an individual's prediction errors on a particular stock, as described above and APSE is the average prediction error on that same stock across all individuals, as defined above. In one embodiment, as a practical matter relating to the computational precision on computers, this expression is used when PSE>0.01 (or some arbitrarily small non-zero number), and if the PSE<0.01 (or some arbitrarily small non-zero number), the value of PSE is set to PSE=0.01 (or some arbitrarily small non-zero number) to avoid any potential division by zero problems. Other techniques for minimizing the risk of a divide by zero are known in the art and may alternatively be applied to the computation.

The Consensus Prediction for the Stock (CPS), also referred to here as the Collective Forecast for a stock, is the result of multiplying each individual prediction for a stock by the weighted prediction stock error (WPSE) for the individual who made the prediction. Then the results of all these multiplications are summed and divided by the number of total predictions for the stock. If $P_1$ is the first prediction made for a stock in a given time period, and $P_n$ is the last prediction made for the stock in a given time period, and $WPSE_n$ is the WPSE of the person making $P_n$, then the Consensus Prediction for the stock is given by the expression: CPS=(($WPSE_1 * P_1$)+($WPSE_2 * P_2$)+ ... ($WPSE_n * P_n$))/$\Sigma WPSE_{1...n}$. Note that if no WPSE exists for a individual, then in one embodiment, the AWPSE (average WPSE) for that individual is used, if no AWPSE exists, then the APSE for that stock is used; and if no APSE exists then some predetermined arbitrary weight may be used, for example a weight of 0.5, or 1.0 may be used. Usually, a somewhat conservative weighting may be desirable to avoid giving too much weight under somewhat uncertain conditions.

Finally, the Average System Error (ASE) is simply the average of all the APSEs in the system, that is ASE=AVG ($PE_{1...n}$), where 1 ... n refers to all PEs for all individuals. The ASE is useful for determining the overall accuracy of the system. Various techniques may be employed in attempt to reduce the ASE.

Having described an embodiment of the procedure and algorithm particularized for generating a collective forecast for stock prices, it will be appreciated that this or an analogous procedure and algorithm may be applied to other quantitative forecasts for other items. The quantitative forecasts find particular application to forecasting financial information such as stock and bond prices, stock index values, interest rates, international currencies, gold and precious metals, agricultural product futures, and the like. They may also be used to fore inventory and sales, such as sales and prices of automobiles, homes, commercial and residential rental/lease rates, and all other manner if goods and services. The quantitative forecasts may also be used to derive qualitative forecasts and assist in decision making. For example, the quantitative predictions may be used to derive qualitative indicators and make decisions, such as for example generating a "buy", "sell", or "hold" recommendation for a stock.

The Last Estimated Closing Price (LECP) described above relative to stocks may be generalized to an Estimated Value (EV) for the item, that is the EV is the individual user's estimate for the item entered for a given value at a specified time. Note that different Estimated Values may be estimated for different times by the same user, for example, $EV(t=t_1), EV(t=t_2), \ldots, EV(t=t_n)$.

The Actual Closing Price (ACP) described above relative to stocks may be generalized to an Actual Value (AV) which is the value for the item at the time or other specified condition. For example, the actual value may be recorded for each hour of the day, the actual value at the closer of normal trading, the value set by a regulatory agency or financial organization, or any other value which is susceptible to prior prediction and then has a value that can be measured or recorded.

The Prediction Error (PE) described above relative to stocks may be generalized to the prediction error for a single individual making a single estimate of the item and is equal to the absolute value of the difference between the estimated value (EV) and the actual value (AV). The prediction error is therefore equal to the absolute value of the difference between the estimated value (EV) and the actual value (AV) divided by the actual value or $PE=(ABS(EV-AV))/AV$. It is noted that as the absolute value is taken, the order of EV and AV in the numerator may be reversed. Furthermore, if it is desired to separately or differently handle over-estimates and under-estimates, the absolute value operation may be eliminated.

The Prediction Item Error (PIE) described above relative to stocks may be generalized to be equal to the average of the Prediction Errors $(PE_1, PE_2, \ldots, PE_n)$ for a single individual on a single item over the entire period that individual has been making predictions about that particular item. If $PE_1$ is the error of the first estimate the individual made for a given item and $PE_n$ is the error of the last estimate the individual made for the same item, then the prediction item error is the average of the individual prediction errors or: $PIE=AVG(PE_1 \ldots PE_n)$.

As before, once the Prediction Item Error (PIE) for each particular individual for a particular item $(PIE_1, PIE_2, \ldots, PIE_n,)$ it is now possible to compute an Average Prediction Item Error (APIE) which is equal to the average of all the Prediction Item Errors $(PIE_1, PIE_2, \ldots, PIE_n,)$ for a particular item who's value is being forecast. Note that the Prediction Item Error is itself an average, so this is really an average of individual averages. If $PIE_1$ is the average error for individual 1, and $PIE_n$ is the average error of the last individual who has made predictions for the item, then the average prediction item error is: $APIE=AVG(PIE_1 \ldots PIE_n)$.

Weights may advantageously be applied and a Weighted Prediction Item Error (WPIE) is therefore defined that is equal to the Average Prediction Item Error (APIE) divided by the Prediction Item Error (PIE). The rationale and manner in which these weightings are applied is analogous to that described for the stock price prediction procedure. Mathematically: the weighted prediction item error is given by the expression $WPIE=APIE/PIE$, where PIE is the Prediction Item Error as described above.

The Consensus Prediction for the Item (CPI), also referred to here as the Collective Forecast for an item, is the result of multiplying each individual prediction for an item by the weighted prediction item error (WPIE) for the individual who made the prediction. Then the results of all these multiplications are summed and divided by the number of total predictions for the item. If $P_1$ is the first prediction made for an item at a give condition or time, and $P_n$ is the last prediction made for the item at the same given condition or time, and $WPIE_n$ is the WPIE of the person making $P_n$, then the Consensus Prediction for the stock is given by the expression:

$$CPI=((WPIE_1 \times P_1)+(WPIE_2 \times P_2)+ \ldots +(WPIE_n \times P_n))/ \Sigma WPIE_{1 \ldots n}.$$

Note that as before, if no WPIE exists for a individual, then in one embodiment, the AWPIE (average WPIE) for that individual is used, if no AWPIE exists, then the APIE for that item is used; and if no APIE exists then some predetermined arbitrary weight may be used, for example a weight of 0.5, or 1.0 may be used. Again, usually, a somewhat conservative weighting may be desirable to avoid giving too much weight under somewhat uncertain conditions.

Finally, the Average System Error (ASE) is simply the average of all the APIEs in the system, that is $AIE=AVG(PE_{1 \ldots n})$, where 1 ... n refers to all PEs for all individuals. This is for every prediction in the system, that is, for all items. The ASE is used as a measure of the overall accuracy of the system. Various techniques can then be applied in an effort to reduce the ASE and thus increase the overall accuracy of the system.

Combining these expressions by successive substitution gives one overall but more complex expression as follows:

Beginning with the expression:

$$CPI=((WPIE_1 \times P_1)+(WPIE_2 \times P_2)+ \ldots +(WPIE_n \times P_n))/ \Sigma WPIE_{1 \ldots n},$$

we first substitute for each WPIE to yield the expression: $CPI=(((APIE/PI)_1 \times P_1)+((APIE/PI)_2 \times P_2)+ \ldots +((APIE/PI) \times P_n))/\Sigma(APIE/PI)_{1 \ldots n}.$ Next, we substitute for each occurrence of APIE to yield the expression:

$$CPI=(((AVG(PIE_1 \ldots PIE_n)/PI)_1 \times P_1)+((AVG(PIE_1 \ldots PIE_n)/PI)_2 \times P_2)+ \ldots +((AVG(PIE_1 \ldots PIE_n)/PI)_n \times P_n))/\Sigma(AVG(PIE_1 \ldots PIE_n)/PI)_{1 \ldots n}.$$

Then, we substitute for each occurrence of PIE to yield the expression:

$$CPI=(((AVG(\{AVG(PE_1 \ldots PE_n)\}_1 \ldots \{AVG(PE_1 \ldots PE_n)\}_n)/PI)_1 \times P_1)+((AVG(\{AVG(PE_1 \ldots PE_n)\}_1 \ldots \{AVG(PE_1 \ldots PE_n)\}_n)/PI)_2 \times P_2)+ \ldots +((AVG(\{AVG(PE_1 \ldots PE_n)\}_1 \ldots \{AVG(PE_1 \ldots PE_n)\}_n)/PI)_n \times P_n))/\Sigma(AVG(PIE_1 \ldots PIE_n)/PI)_{1 \ldots n}.$$

So that the combined expression has the following form:

$$CPI=(((AVG(\{AVG([(ABS(EV-AV))/AV]_1 \ldots [(ABS(EV-AV))/AV]_n)\}_1 \ldots \{AVG([(ABS(EV-AV))/AV]_1 \ldots [(ABS(EV-AV))/AV]_n)\}_n)/PI)_1 \times P_1) + ((AVG(\{AVG([(ABS(EV-AV))/AV]_1 \ldots [(ABS(EV-AV))/AV]_n)\}_1 \ldots$$

$$\{AVG([(ABS(EV-AV))/AV]_1 \ldots [(ABS(EV-AV))/AV]_n)\}_n)/PI)_2 \times P_2) + \ldots + ((AVG(\{AVG([(ABS(EV-AV))/AV]_1 \ldots [(ABS(EV-AV))/AV]_n)\}_1 \ldots$$

$$\{AVG([(ABS(EV-AV))/AV]_1 \ldots [(ABS(EV-AV))/AV]_n)\}_n)/PI)_n \times P_n))/\Sigma(AVG(PIE_1 \ldots PIE_n)/PI)_{1 \ldots n},$$

where EV is the estimated value for individual predictors and AV is the actual value of the predicted value.

It will be appreciated in light of the description provided here that the invention is not limited to this particular mathematical procedure or formulation of the mathematical procedure. By way of illustration but not of limitation, the method may be altered in various ways yet maintain the inventive concept. No or different weighting schemes may be used. Operations other than averaging or mean value may be used in place of the averages used in the afore described formulation. Various statistical measures may optionally be incorporated. Different functional or parametric relationships may be applied for different types of forecasts or predictions. The computation may be modified according to the number of individual predictions forming a collective prediction.

In another aspect, the invention provides various business operating models. For example, the invention provides a business operating model or method for a subscription or pay-per-quote type operation. Revenue is generated by quote subscription fees and/or pay-per-quote fees. For example, customers pay a monthly subscription fee in order to access a certain number of collective forecasts each month. Alternatively, customers might pay a small fee for each collective forecast they request.

In order to motivate customers to participate by providing their individual forecasts, credit might be given for each individual forecast a customer enters into the system. The amount of credit might for example vary depending upon the quality of the information submitted. Higher quality information would be deemed more valuable and would receive greater credit. Higher quality information may generally be information which ultimately proves to be accurate prediction information. Customers might use their credit to pay for collective forecasts. If a customer's credits were exhausted, then that customer would begin paying actual money for information. Customer credit might also be exchanged for prizes or cash. Profit could be made by charging more for the processed collective information than was paid out to the individual providers of information.

Note that this business model described above is quite general and is not limited to systems that forecast stock prices—or even systems that do forecasting of any sort. The general idea is to pay (credits) for information and then charge more for the processed information than one paid for the raw (unprocessed) information. The added value comes from the processing of the information—which may involve combining information from many individual sources in order to produce more reliable or useful information. Just as a steel factory takes in iron ore and produce more valuable steel by processing the raw material, so too can a collective intelligence system take in raw information, process and combine it with other information, and produce much more valuable information which can be sold back to the individuals who provided the raw material.

Another embodiment of the invention provides a second business model, specific to the use of the inventive system and/or method with wireless devices. The inventive system and/or method is licensed to providers of wireless services. For example, cellular phone service providers (GTE, Cellular One, Verizon, Cingular, AT&T, Sprint, and the like), the Palm Pilot's wireless service (Palmnet), and paging services (Skytel etc.) all might be interested in licensing the technology. The wireless service providers would probably charge their customers a small fee for using the inventive system and/or method on their cell phone, pager, PDA, or other wireless device. However the wireless service providers would also generate increased revenue based on additional airtime charges.

A third business model depends upon advertising revenues. The tomorrow ticker itself, that is the two line ticker or variant thereof that provides the scrolling ticker with collective forecasts—is similar to a dynamic banner. In addition to providing delayed quote information and forecast information, it may optionally display advertising. The ads scroll—intermixed with the content information—or may be part of the stationary frame in which the content scrolls. Revenue would be generated by advertisers paying for space for placing advertising content in the Tomorrow Ticker. Since the content is dynamic—for example users can choose which stocks they wish to see in the ticker—the ads could be targeted to the particular customers. For example, customers that configure their Tomorrow Ticker to include IBM in the list of scrolling stocks, might see ads from IBM appear when the share price of IBM scrolled by.

A fourth embodiment of a business model according to the invention is to use the inventive system and method, also referred to as the "Tomorrow Ticker Technology", as part of the management of mutual funds or other financial trading entities. In this model, the technology becomes a competitive advantage of the find or entity and a portion of the profits generated by using the technology might be paid as a licensing fee and/or find manager's fee.

According to a fifth embodiment of the invention, a business model is provided that uses the capabilities of the inventive Tomorrow Ticker Technology in fields other than financial markets—e.g. inventory control. Here, it is inventory needs that are forecast so that intelligent buy, sell, and pricing decisions may be made. In this case the inventive system and method are technology is licensed to companies for a fee who would then use the technology to reduce their internal costs (e.g. inventory costs).

In addition to providing an inventive system, method, computer program and computer program product, and various business operating models, it should be apparent to workers having ordinary skill in the art in light of the description provided herein that the invention (also referred to as the Tomorrow Ticker Technology) may be applied to forecasting variables related to a wide range of financial and consumer goods and services markets. Examples of such financial applications include, without limitation, bonds, interest rates, real estate prices, mortgage rates, stock options, Treasury bill prices, and currency exchange rates.

Forecasting may also or alternatively include key variables that have significant financial impact such as credit ratings for companies, analyst recommendations, consumer confidence numbers, sales numbers, inventory turnover rate, quality statistics, consumer satisfaction ratings, earnings, and savings rates.

Providing better forecasts for these variables would provide customers with opportunities to make money. For example, if a company's credit was forecast to go up, one could buy bonds in that company now and then sell them for a profit when the company's credit was upgraded. Similarly, good forecasts of inventory turnover, would allow companies to plan better and reduce their inventory, thus reducing costs.

The inventive Tomorrow Ticker Technology may also be applied to a wide range of events that depend upon the behavior of large numbers of people. For example, forecasting traffic patterns, vacation trends, demographic changes, election results, consumer spending patterns, and a wide range of other human behavior patterns, are all applications using the basic inventive system, method, and technology.

In the example of forecasting traffic patterns, people have the option of entering what route they plan to take (or are in the process of taking) via a cell phone, PDA, or other communication device or instrument. The system would combine input from many individuals and project which areas would be most likely to have traffic. The system could return these projections to people together with recommendations to minimize time spent in traffic.

One of the advantages of the inventive approach is that the system is able to provide real-time, continuously updated, forecasts, based on the latest information. Rather than drive to the beach on a sunny day only to find that everyone else had the same idea, you can get a real-time estimate of how many people will be at the beach and 1:35 p.m. today, based on input from hundreds of people. Some of these people will be very accurate at estimating the numbers of beach goers (may be they are lifeguards). These accurate estimators will get more weight in the system and the "volume" (weight) of their input will be turned up. Other people are less accurate and the "volume" of their input will be turned down. The more accurate estimators receive more credit, which can be used to find out other information that may be of interest—or perhaps exchanged directly for cash and/or prizes.

Having now described some aspects of the invention it will be appreciated by those workers having ordinary skill in the art in light of the description provided herein that the various aspects of the invention may be implemented in many different ways and includes device implementations, system implementations, methods and procedures, computer software and/or firmware programs, computer program application software products, and combinations of these.

In one particular embodiment, the invention provides an information processing system comprising: a server computer having a processor for executing computer instructions and a memory coupled to the processor for storing instructions and data during the processing; a communications link for communicating between the server computer and information appliance client entities external to the server computer, the communication link enabling receipt of first information from a plurality of external entities and for transmitting second information to second entities, the first and second entities may be the same entities or different entities; a data store defining a database for storing the first information and the second information; a computer program having a plurality of executable command instructions and executing in the processor and the memory for generating the second information from at least some of the plurality of the first information; wherein the first information comprising a plurality of individual information items and the second information comprising a processed collective information generated from the plurality of individual information items and having an increased value to the second entities by virtue of the collective contribution and processing applied thereto.

In another particular embodiment, the invention provides a method of generating a collective information for a particular item from a plurality of raw information for that same item, the method comprising: gathering raw information from a plurality of first entities for a particular item; processing the plurality of raw information or informations for the particular item to generate a processed collective information for the item; and communicating the processed collective information to second entities.

In another aspect, the inventive method is implemented as a computer software program executing on one or more computers or information appliances, such as for example on a conventional server computer serving content and providing information or data to client computers or devices over an internet network connection. In such situations, the invention provides a computer program and computer program product for use in conjunction with a computer system, the computer program product comprising a computer readable storage medium and a computer program mechanism embedded therein, the computer program mechanism, including a program module that directs the computer to function in a specified manner, the program module including instructions for generating a collective information for a particular item from a plurality of raw information for that same item, by gathering raw information from a plurality of first entities for a particular item, processing the plurality of raw information or informations for the particular item to generate a processed collective information for the item, and communicating the processed collective information to second entities.

In any of these embodiments, the type of information provided as raw or unprocessed data or input may for example be selected from the set of information consisting of: stock prices, bond prices, real estate prices, interest rates, inventory figures, sales figures, consumer confidence estimates, other financial information, vacation plans, traffic routes, sports scores, election results, election forecasts and polling, predictions of actions by individuals, predictions of actions groups, predictions of actions companies, or predictions of actions nations, battlefield and/or military intelligence, other non-financial information, and combinations thereof.

In addition to the processing algorithm for generating collective forecasts or predictions from individual predictions, forecasts, or inputs, numerous alternative algorithms may be applied either alone or in combination with other algorithms or computations. For example, an algorithm or procedure utilizing a simple average may be used. Alternatively, the procedure for generating the collective information may compute a weighted average of inputs. Such weighted average of inputs may provide that the weighting is based on the accuracy of the entity supplying the information. Alternatively, it may provide that the weighting uses other methods for assigning weights such as the weighted majority algorithm, shifting expert algorithms, or other algorithms known in the art of mathematics, statistics, and/or computer science.

Alternatively, the weighting may be determined by linear regression or other statistical techniques of regression. Furthermore, for any of the afore described weighting schemes, the weighting may incorporate a time factor such that more recent performance counts more heavily than older performance. The weighting may also or alternatively be dynamic so that the system, method, and/or constituent procedures and subsystems change as it learns better ways of weighting in order to minimize the error between forecast information or values and actual information or values.

Alternatively or in addition, metrics, measures, or statistics other than the average such as the median, mode, range, variance, standard deviation, or the use of statistical methods that attempt to determine how likely or unlikely a given event is, including Bayesian analyses, may alternatively be used in procedure for generating the collective information or value from the individual information or informations.

In one embodiment, the inventive system and method advantageously provide means for effectively sampling a population with respect to an information, value, or variable of interest, such as investor sentiment.

In one embodiment, a securities investment decision, such as a stock or bond investment decision, is automatically driven by the forecasts and/or processing of the system.

In one embodiment, an entities input, such as an individual user entity input, is filtered to remove information from people who are attempting to "game" the system, where a determination as to whether an entity is attempting to game the system may be made according to predetermined rules or policies.

In one embodiment, the display of the forecast information takes the form of a scrolling ticker that displays both current values for a given information, value, variable, or other indicia, and future values for the same information, value, variable, or other indicia. In one embodiment the scrolling ticker displays stock prices. In one embodiment, the scrolling ticker displays two or more lines of information.

In one embodiment, the person using the inventive system, method, and/or computer program and viewing the scrolling ticker can customize what appears on the ticker based on the user's own preferences. The customization may include one or more of the size, font, color, or other characteristics of alpha-numeric or other symbolic or textual content, characteristics of any background field or image, class or type of advertising where advertising is provided, speed or direction of scrolling, location of the scrolling ticker on the screen, as well as other features, attributes, or characteristics of the scrolling ticker. For example, the ticker may be sized or resided. The ticker may be configured to display in a vertical orientation or in a horizontal orientation, or in any other orientation. In another embodiment, the ticker is capable of displaying advertisements interspersed with the scrolling content.

In another embodiment, the ticker is stationary with values for items displayed changing over time but not scrolling on the display screen. For example, the advertisement display mechanism is intelligent and recognizes the content of the ticker and displays ads that are deemed most relevant to the content that is currently scrolling. The advertisement(s) to be displayed may be selected based on some set of predetermined or dynamically adaptive rules or policies.

In another embodiment, the ticker is capable of displaying ads in the non-scrolling "frame portion" of the ticker. In this embodiment, the ad display mechanism may also be intelligent and recognizes the content of the ticker and displays ads that are deemed most relevant to the content that is currently scrolling.

In another embodiment, the ticker can display both numeric, alphanumeric, and symbolic information, in which the form or appearance of the display or portions of the display may be altered to indicate some additional information relative to other information. For example, color coding of boldness may be utilized. In one embodiment, a green color is used to display prices (or other attributes) for stocks going up and red color is used to display prices (or other attributes) for stocks going down.

In one embodiment, the ticker can be downloaded to a PC web browser, PDA, cell phone, or other wireless or non-wireless (wired) device as a standalone applet or piece of client computer program code that can communicate with a server to display information dynamically.

In one embodiment, the PDA, cell phone, or other wireless device can also periodically load the latest forecast information into the ticker applet (and operate independently) without continuous connectivity, such as for example via a "hot-synch" or only periodic (or intermittent) connections to the network.

In one embodiment, the system and method provide means for gathering or otherwise acquiring information (including parsing and extracting such information where required) submitted by individual entities and also other information that is available from other entities such as government statistics, corporation reports, securities and exchange commission (SEC) documents and/or filings, and all other manner of information such that the information may be used to produce a value-added or augmented information.

In one embodiment, users and in some instances subscribers receive some form of compensation or credit for providing information to the system. Advantageously, the amount of compensation or credit (if any) id determined in part by the quality of information provided. The quality of the information may for example be determined in part by the accuracy of the information, the timeliness of the information, the number of hours or days in advance that an accurate forecast is made when the information provided is a future forecast, and combinations of these or other quality factors.

In one embodiment, users receiving credit can use their accumulated credits to purchase or otherwise obtain the right to see or otherwise obtain the value-added collective information generated. In one embodiment, the users receiving credit can exchange the credit for prizes, cash, or other good or services. In one embodiment, the information supplied by a plurality of users is processed to generate value-added information that is available for further incorporation or inclusion as input to a larger collective intelligence or global intelligence system and/or method. For example, in one particular embodiment, such a system would have military applications both for military intelligence and for battlefield intelligence. In another embodiment, such a system might provide useful forecasts that could help a more sophisticated collective intelligence system solve problems based on forecast information.

The foregoing description, for purposes of explanation, used specific nomenclature to provide a thorough understanding of the invention. However, it will be apparent to one skilled in the art in light of the description provided herein that the specific details are not required in order to practice the invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

I claim:

1. An information processing system comprising:
   a server computer having a processor for executing computer instructions and a memory coupled to said processor for storing instructions and data during processing;
   a communications port for coupling with an external communications link or network adapted to support communications between said server computer and devices external to said server computer, said communication link or network enabling receipt of first raw contributed information from a plurality of external first entities and for transmitting second consensus collective information to any of said external first entities or to external second entities;
   a data store defining a database for storing said first raw contributed information and said second consensus collective information; and
   a computer program having a plurality of executable command instructions and executing in said processor and said memory for generating said second consensus collective information from at least some of said plurality of first raw contributed information;
   said first raw contributed information comprising a plurality of individual raw contributed information items each generated by an external human contributor and received by the server over said communications link or network; and
   said second consensus collective information generated from said plurality of individual raw contributed information items by weighting each of each said individual raw contributed information items according to an objective accuracy measure and aggregating said weighted raw contributed individual information items, and having an increased value by virtue of the accuracy provided by the objective accuracy-based weighted consensus collective aggregation of the plurality of individual raw contributed information items.

2. The system in claim 1, wherein the first entities comprise individual persons who provide the raw contributed information items and said second entities comprise individual persons who are consumers of the processed collective information.

3. The system in claim 1, wherein the first entities comprise individual persons that provide the raw contributed information and are different from the second entities who comprise individual persons, or where the second entities request different consensus collective information that is not based on the raw contributed information items they submitted to the server.

4. The system in claim 1, wherein the raw contributed information comprises numeric future event prediction information.

5. The system in claim 1, wherein the raw contributed information comprises non-numeric future event prediction information.

6. The system in claim 1, wherein the communications port for coupling with a communications link or network of for coupling with an Internet network communication link, and said external devices comprise client computers or information appliances coupled to said server computer via said Internet network communication link.

7. The system in claim 6, wherein at least one of said computer server and said client computers or information appliances are coupled to said server computer via said Internet network communication link and interface for communication with said server computer using an Internet web-based browser.

8. The system in claim 1, wherein the communications link or network comprises a wireless communications link, and said external devices comprise wireless client computers or information appliances selected from the set consisting of a notebook computer, a PDA, and a cellular or mobile telephone, coupled to said server computer via said wireless communications link.

9. The system in claim 8, wherein the external device include software of firmware applets or other downloadable client software that executes on wireless or wired devices.

10. The system in claim 1, wherein said server computer further comprise an Internet website interface accessible over said communications link or network that can be accessed by wireless or non-wireless browsers executing on said external devices.

11. The system in claim 1, wherein the first raw contributed information is selected from the set of information types consisting of: stock prices, bond prices, security prices, real estate prices, interest rates, inventory figures, sales figures, consumer confidence estimates, other financial information, vacation plans, traffic routes, sports scores, election results, predictions of actions by individuals, predictions of actions by groups, predictions of actions by companies, predictions of actions by nations, battlefield intelligence, military intelligence, national security intelligence, other non-financial information, and combinations thereof.

12. The system in claim 1, wherein the computer program generating said second consensus collective information from at least some of said plurality of said first raw contributed information items includes computer program instructions computing an average to generate said second consensus collective information from said plurality of first raw contributed information items.

13. The system in claim 1, wherein said plurality of first raw contributed items are contributed by human contributors via said communications port; and the computer program generating said second consensus collective information from at least some of said plurality of said first raw contributed information items includes computer program instructions computing a weighted average by applying a weighing amount to each of said plurality of first raw contributed information items to generate said second consensus collective information from said plurality of first raw contributed information items.

14. The system in claim 13, wherein the weighting applied to each of said first raw contributed information items is based on the historical accuracy of the particular first entity supplying the particular first raw information item to the server.

15. The system in claim 13, wherein the weighting uses other methods for assigning and applying weights to the individual raw information items selected from the set of weighting methods consisting of a weighted majority algorithm, a shifting expert algorithm, or any other weighing algorithms known in the art.

16. The system in claim 13, wherein the weighting applied to each of said first information items is determined by linear regression or other statistical techniques of regression.

17. The system in claim 13, wherein the weighting applied to each of said first information items incorporates a time factor such that more recent performance counts more heavily than older performance.

18. The system in claim 13, wherein the method of weighting changes as the system itself learns better ways of weighting in order to minimize the error between a forecast second information value and an actual value for the forecast value.

19. The system in claim 13, wherein the algorithms for generating the second information are selected from the set of algorithms consisting of: computing statistics other than the average, and using statistical methods that attempt to determine how likely or unlikely a given event is.

20. The system in claim 19, wherein the statistics other than the average are selected from the set consisting of: computing a median, computing a mode, computing a range, computing a variance, and computing a standard deviation; and the statistical methods that attempt to determine how likely or unlikely a given event is includes using a Bayesian analyses to determine how likely or unlikely a given event is.

21. The system in claim 1, wherein the generation includes actively and dynamically sampling a population of human contributors to obtain current sentiment with respect to a variable of interest including an investor current sentiment variable.

22. The system in claim 1, wherein the system further includes means for making an investment decision and the investment decision is automatically driven by a future value forecasts generated by the system.

23. The system in claim 1, wherein input raw information is filtered to remove information from entities determined to be attempting to provide information intended to game the system.

24. The system in claim 1, wherein the second information is an output forecast information and the display of the output forecast information takes the form of a scrolling ticker display output on an output device that displays both current values for a given variable and future values for the same variable.

25. The system in claim 24, wherein the variables include stock prices.

26. The system in claim 24, wherein there are two or more lines in the scrolling ticker, and one of the two or more lines displays the current values of a given variable and the other of the two or more lines displays the future values for the same given variable.

27. The system in claim 24, wherein the user may customize what appears on the ticker based on user preferences.

28. The system in claim 24, wherein the ticker is resizable.

29. The system in claim 24, wherein the ticker can be configured to display horizontally or vertically.

30. The system in claim 24, wherein the ticker is capable of displaying advertisements interspersed with the scrolling content.

31. The system in claim 30, wherein the ad display mechanism is intelligent and recognizes the content of the ticker and displays ads that are deemed most relevant to the content that is currently scrolling.

32. The system in claim 31, wherein the ticker displays ads in a non-scrolling frame portion of the ticker.

33. The system in claim 32, wherein the ad display mechanism is intelligent and recognizes the content of the ticker and displays ads that are deemed most relevant to the content that is currently scrolling.

34. The system in claim 24, wherein the ticker can display both numeric, alphanumeric, and symbol information, which is color-coded.

35. The system in claim 24, wherein the ticker can be downloaded to a PC web browser, PDA, cell phone, or other wireless or non-wireless device as a standalone applet or piece of client code that can communicate with a server to display information dynamically.

36. The system in claim 35, wherein the PDA, cell phone, or other wireless device can also periodically load the latest forecast information into the ticker applet and operate independently without continuous connectivity or with only occasional connections to the network.

37. The system in claim 1, wherein the system further includes means for processing not only information submitted by individuals but also other information available from the network in order to generate value-added information.

38. The system in claim 1, wherein first raw contributed information providing entities get credit for providing information to the system.

39. The system in claim 38, wherein such credit is determined in part by the quality of the information provided.

40. The system in claim 39, wherein quality is determined in part by one or more of (i) the accuracy of the information as compared to the actual information, (ii) the timeliness of the information, and (iii) the period of time in advance that an accurate forecast is made when the information is a future forecast.

41. The system in claim 38, wherein first entities can use the received credit to buy the right to see value-added information including the right to see the second consensus collective information.

42. The system in claim 38, wherein entities can exchange credit for prizes, cash, or other compensation.

43. The system in claim 1, further comprising means of combining information from many individuals and processing it to produce value-added information is incorporated as part of the mechanism for a larger collective intelligence or global intelligence system.

44. The system in claim 43, wherein such a system is a military intelligence system.

45. The system in claim 1, wherein:
the first entities comprise individual persons who provide the raw information are said second entities who comprise individual persons who are also the consumers of the processed collective information;
the communications link comprises an Internet network communication link, and said external devices comprise client computers or information appliances coupled to said server computer via said Internet network and at least one of said computer server and said client computer or information appliance interface for communication using an Internet web-based browser;
the first raw contributed information is selected from the set of information types consisting of: stock prices, bond prices, security prices, real estate prices, interest rates, inventory figures, sales figures, consumer confidence estimates, other financial information, vacation plans, traffic routes, sports scores, election results, predictions of actions by individuals, predictions of actions by groups, predictions of actions by companies, predictions of actions by nations, battlefield intelligence, military intelligence, national security intelligence, other non-financial information, and combinations thereof;
the computer program generating said second information from at least some of said plurality of said first information includes computer program instructions computing a weighted average by applying a weighing amount to each of said plurality of first information items to generate said processing second information from said plurality of first information inputs, and the weighting applied to each of said first information items is based on the historical accuracy of the particular first entity supplying the information; and the second information is a forecast information and the display of the forecast information takes the form of a scrolling ticker that displays both current values for a given variable and future values for the same variable.

46. The system in claim 1, wherein said first and second entities are the same entities.

47. The system in claim 1, wherein said first and second entities are different entities.

48. The system in claim 1, wherein the first raw contributed information is selected from the set of information types consisting of: predictions of stock prices, predictions of bond prices, predictions of security prices, predictions of real estate prices, predictions of interest rates, predictions of inventory figures, predictions of sales figures, predictions of consumer confidence, predictions of other financial information, predictions of vacation plans, predictions of traffic routes, predictions of sports scores, predictions of election results, predictions of actions by individuals, predictions of actions by groups, predictions of actions by companies, predictions of actions by nations, predictions of battlefield intelligence, predictions of military intelligence, predictions of national security intelligence, predictions of other non-financial information, and combinations thereof.

49. The system in claim 48, wherein each of the predictions is a newly made current prediction made by a human predictor just prior to communicating it to the server.

50. The system in claim 1, wherein the objective accuracy measure is a past-performance based objective historical accuracy performance measure.

51. The system in claim 1, wherein entities that provide the information are also the entities that consume the information.

52. The system in claim 1, wherein entities provide the first information so that they have the option of receiving the second information.

53. The system in claim 1, wherein the first information includes a first individual information and the second information includes a weighted aggregate consensus information.

54. The system in claim 1, wherein the first information includes a first individual prediction information and the second information includes a weighted aggregate consensus prediction information.

55. The system in claim 1, wherein the weighted aggregate consensus information having a value that is related to its accuracy relative to a future actual information.

56. The system in claim 1, wherein the first information is provided in response to a query to human contributors for information not contained in the database prior to the query and submitted to the system and entered into the database only after the query.

57. The system in claim 1, wherein the processed consensus collective information comprises a prediction of a future value.

58. The system in claim 1, wherein the weighting of new information created by humans whereas Krishnan's involves weighting relevance of pre-existing objects in a database.

59. The system in claim 1, wherein the weighting is a weighting according to historical accuracy not preferences.

60. The system in claim 1, wherein the weights are selected or adjusted according to an absolute accuracy metric and are not weighted according to like, dislike, or relevancy.

61. The system in claim 1, wherein the first information includes a first individual prediction information and the second information includes a weighted aggregate consensus prediction information, and the weighted aggregate consensus prediction information is generated at least in part by applying a different non-unity weight to different ones of the first individual prediction information items.

62. A system as in claim 1, wherein said second collective consensus information includes a component given by an expression of the form:

$$CPI = K \times ((WPIE_1 \times P_1) + (WPIE_2 \times P_2) + \ldots + (WPIE_n \times P_n))/\Sigma WPIE_{1\ldots n},$$

where K is a proportionality constant.

63. A system as in claim 1, wherein said second collective consensus information includes a component that is a normalized sum of a plurality of individual inputs that are each weighted by a weighting factor.

64. An information processing system comprising:
a server computer having a processor for executing computer instructions and a memory coupled to said processor for storing instructions and data during said processing;
a communications link for communicating between said server computer and information appliance client entities external to said server computer, said communication link enabling receipt of first information from a plurality of external entities and for transmitting second information to second entities, said first and second entities may be the same entities or different entities;
a data store defining a database for storing said first information and said second information;
a computer program having a plurality of executable command instructions and executing in said processor and said memory for generating said second information from at least some of said plurality of said first information;
said first information comprising a plurality of individual information items and said second information comprising a processed collective information generated from said plurality of individual information items and having an increased value to said second entities by virtue of the collective contribution and processing applied thereto;
the computer program generating said second information from at least some of said plurality of said first information and includes computer program instructions computing a weighted average by applying a weighing amount to each of said plurality of first information items to generate said processing second information from said plurality of first information inputs; and
said second information is a consensus collective prediction given by an expression of the form:

$$CPI = K \times ((WPIE_1 \times P_1) + (WPIE_2 \times P_2) + \ldots + (WPIE_n \times P_n))/\Sigma WPIE_{1\ldots n},$$

where K is a proportionality constant.

65. A method of generating a consensus collective information for a particular item from a plurality of raw information inputs contributed by a plurality of human contributors for that same item, the method comprising:
soliciting raw information contribution inputs for a particular item over an interactive electronic network;

gathering a plurality of raw information contribution inputs in response to said solicitation from a plurality of first entities for the particular item, each raw information contribution input being generated by an external human contributor and received over said interactive electronic network;

storing said plurality of gathered raw information contribution inputs into a database;

processing said plurality of raw information contribution inputs for said particular item to generate a processed consensus collective information for said item, said processing including weighting each of each said plurality of raw information inputs by a weighting factor determined according to an objective accuracy measure and aggregating said weighted raw information inputs to generate the processed consensus collective information as an output and having an increased value by virtue of the accuracy provided by the objective accuracy-based weighted consensus collective aggregation of the plurality of individual raw contributed information inputs;

storing said processed consensus collective information into said database; and communicating said processed consensus collective information to second entities over said interactive electronic network.

66. A method as in claim 65, wherein said raw information input comprises an individual raw prediction and said processed collective information comprises a processed consensus collective prediction based on a plurality of weighted individual raw prediction inputs.

67. A method as in claim 65, wherein said raw information input comprise a non-numeric information and said processed consensus collective information comprises a processed non-numeric information based on a plurality of weighted individual raw non-numeric information inputs.

68. A method as in claim 67, wherein said non-numeric information comprises a geographic location.

69. A method as in claim 67, wherein said non-numeric information comprises a travel route.

70. A method as in claim 65, wherein said raw information comprises a travel time.

71. A method as in claim 65, wherein said raw information comprise a quantitative prediction and said processed collective information comprises a processed consensus collective prediction.

72. A method as in claim 65, wherein said raw information comprises a quantitative prediction value and said processed collective information comprises a processed collective prediction value.

73. A method as in claim 65, wherein said raw information comprises a quantitative numeric prediction value and said processed collective information comprises a processed collective numeric prediction value.

74. A method as in claim 65, wherein at least some of the first entities from which the plurality of individual prediction values are gathered are the same as the second entities.

75. A method as in claim 65, wherein at least some of the first entities from which the plurality of individual prediction values are gathered are different entities from the second entities.

76. A method as in claim 65, wherein the first entities from which the plurality of individual prediction values are gathered are different entities from the second entities.

77. A method as in claim 65, wherein the information comprises a numeric information.

78. A method as in claim 65, wherein the numeric information comprises a security price.

79. A method as in claim 65, wherein the gathering of raw information comprises gathering the raw information on a web-server and storing the gathered information in a database within or communicatively coupled with said web server.

80. A method as in claim 65, wherein the web-server interacts with at least one of said entities through a web-server client web-browser interface.

81. A method as in claim 65, wherein the web-server interacts with at least one of said entities through a web-server client web-browser interface on a personal computer.

82. A method as in claim 65, wherein the web-server interacts with at least one of said entities through a web-server client web-browser interface on a personal data assistant (PDA).

83. The method in claim 65, wherein the raw information input is selected from the set of information input types consisting of: predictions of stock prices, predictions of bond prices, predictions of security prices, predictions of real estate prices, predictions of interest rates, predictions of inventory figures, predictions of sales figures, predictions of consumer confidence, predictions of other financial information, predictions of vacation plans, predictions of traffic routes, predictions of sports scores, predictions of election results, predictions of actions by individuals, predictions of actions by groups, predictions of actions by companies, predictions of actions by nations, predictions of battlefield intelligence, predictions of military intelligence, predictions of national security intelligence, predictions of other non-financial information, and combinations thereof.

84. A server adapted to receive a plurality of raw prediction information contributions over a communications link or network and to generate a consensus collective weighted forecast information, said server comprising:

an interface to said communications link or network for receiving said plurality of raw prediction information contributions and for sending said consensus collective weighted forecast information to external entities;

a processor for executing computer program instructions and a memory coupled to said processor for storing instructions and data during said execution;

a data store adapted to store said received plurality of first raw contributed prediction information and said generated consensus collective weighted forecast information;

said first raw contributed prediction information comprising a plurality of individual raw contributed prediction information items each generated by an external human contributor and received by said server over said communications link or network; and a computer program having a plurality of executable command instructions for execution in said processor and said memory for generating a second consensus collective weighted forecast information from at least some of said plurality of first raw contributed prediction information from at least some of said plurality of said first raw contributed prediction information, said computer program including instructions for receiving said plurality of first raw contributed prediction information items and for applying weighting factors determined according to an objective historical contributor accuracy measure for each of said raw prediction information contribution items, and for aggregating said weighted raw prediction information contribution items to generate said consensus collective weighted forecast information.

85. A server as in claim 84, wherein said raw contributed prediction information comprises a stock market financial numerical or non-numerical prediction for a future period, and said consensus collective weighted forecast information comprises a consensus collective weighted forecast information for the same stock market financial numerical or non-numerical prediction for the same future period.

86. A server as in claim 84, wherein said consensus collective weighted forecast information includes a component given by an expression of the form:

$$CPI = K \times ((WPIE_1 \times P_1) + (WPIE_2 \times P_2) + \ldots + (WPIE_n \times P_n))/\Sigma WPIE_{1\ldots n},$$

where K is a proportionality constant.

87. A business method for providing a consensus collective weighted forecast information, said method comprising:
soliciting a plurality of raw prediction information contribution inputs for a particular topic over an interactive electronic network;
receiving said plurality of raw prediction information contribution inputs in response to said solicitation from a plurality of contributors over said interactive electronic network, each raw prediction information contribution input being generated by an external human contributor and received over said interactive electronic network;
storing said plurality of received raw prediction information contribution inputs into a database;
processing said plurality of raw prediction information contribution inputs for said particular topic to generate said consensus collective weighted forecast information for said topic by applying weighting factors to each said plurality of raw prediction information contribution inputs determined according to an objective historical contributor accuracy measure and aggregating said weighted raw contributed prediction information inputs to generate said processed consensus collective weighted forecast information as an output and having an increased value by virtue of the accuracy provided by the objective accuracy-based weighted consensus collective aggregation of the plurality of individual raw prediction information contribution inputs;
storing said consensus collective weighted forecast information into said database; and
communicating said consensus collective weighted forecast information for said particular topic to a recipient in exchange for a payment over said interactive electronic network.

88. A business method as in claim 87, further comprising providing a credit to each of said contributors for a raw prediction contribution; and wherein the payment may be made in the form of a monetary payment or in exchange for said credit.

89. A business method as in claim 87, wherein said raw prediction information comprises a stock market financial numerical or non-numerical prediction for a future period, and said consensus collective weighted forecast information comprises a consensus collective weighted forecast information for the same stock market financial numerical or non-numerical prediction for the same future period.

90. A business method as in claim 87, wherein said consensus collective weighted forecast information includes a component given by an expression of the form:

$$CPI = K \times ((WPIE_1 \times P_1) + (WPIE_2 \times P_2) + \ldots + (WPIE_n \times P_n))/\Sigma WPIE_{1\ldots n},$$

where K is a proportionality constant.

* * * * *